United States Patent [19]

Yundt

[11] 4,061,836

[45] Dec. 6, 1977

[54] THERMOGRAPHIC RECORDING SYSTEM

[75] Inventor: Albert P. Yundt, Medfield, Mass.

[73] Assignee: Bard Laboratories, Inc., Amherst, N.H.

[21] Appl. No.: 676,426

[22] Filed: Apr. 13, 1976

[51] Int. Cl.[2] .......................... B32B 29/00; B05D 3/02

[52] U.S. Cl. ...................................... 428/537; 427/56; 427/395; 427/444; 428/913

[58] Field of Search ................. 427/150, 151, 56, 395, 427/444; 428/913, 537; 260/583 EE; 282/27.5

[56] References Cited

U.S. PATENT DOCUMENTS

| | | | |
|---|---|---|---|
| 1,880,449 | 10/1932 | Hickman et al. | 96/59 X |
| 2,999,035 | 9/1961 | Sahler | 427/146 X |
| 3,024,362 | 3/1962 | Sus et al. | 427/385 B |
| 3,394,185 | 7/1968 | Clemens | 260/583 EE |
| 3,736,166 | 5/1973 | Lawton | 428/913 X |

OTHER PUBLICATIONS

Galloway et al., Chem. Abs., vol. 46, No. 9469c (1952).

*Primary Examiner*—Harry J. Gwinnell
*Attorney, Agent, or Firm*—Fitch, Even, Tabin & Luedeka

[57] ABSTRACT

Thermorecording sheet, thermorecording method and method of manufacture of a thermally responsive recording paper comprising a reversibly reduced cyclic polyketo compound, such as hydrindantin and an N,N' polythiodiamine having a sulfur chain length of at least two sulfur atoms.

13 Claims, No Drawings

THERMOGRAPHIC RECORDING SYSTEM

The present invention is directed to thermally responsive recording systems and more particularly is directed to such thermally responsive recording systems which employ a thermally responsive amine-polyketo color compound reaction system.

Various types of heat sensitive recording sheets are known in which selective thermal activation of a thermally responsive sheet is employed in the recording of information. Thermographic copying processes, such as those using non-focussed infra-red radiation, and in which a thermally responsive copy sheet is placed in intimate contact with a graphic original or master and exposed to infra-red radiation to cause selective heating of the copy sheet with image formation in conformity with the master (such as described in U.S. Pat. No. 2,740,896) represent one type of thermographic recording systems. Other methods of selective thermal activation are also known in thermally responsive recording systems, such as thermal activation through the use of coherent laser radiation, focussed infra-red radiation, and a stream of hot air directed through a capillary tube (e.g., such as described in British Pat. No. 282,759).

Principal conventional applications for thermally responsive reproduction systems include thermal printers for data terminal and computer print-out systems, and chart recording instruments in which a trace is made on a thermally responsive chart paper by a heated stylus. Thermal chart recorders have found considerable use in industrial and medical instrumentation.

The performance and acceptability of thermally responsive chart recording papers for use with heated stylus recording instruments may have deficiencies in a number of areas. Such papers should not be overly pressure sensitive, and the pressure sensitivity which is characteristic of conventional blush coated and cellular coated thermally responsive papers described in U.S. Pat. Nos. 2,299,991, 2,665,262 and 2,739,909 is a disadvantage of such papers. Image permanence and paper stability to handling and storage are additional qualities in a thermal chart paper which are desirable, but difficult to achieve in commercial practice. Furthermore, a suitable thermal chart recording paper intended for use with a heated stylus should not cause stylus fouling or buildup, should not be toxic, and should have wide response latitude with respect to marking speed. The paper should also best be light colored, and preferably white, in its unmarked form, and should produce a dark and preferably dense black mark upon thermal activation.

A wide range of color reaction systems has been proposed or used for thermographic recording sheets, including those involving oxidation of aniline and its analogs, conversion of leuco compounds to the colored form, formation of metal sulfides as through the use of heavy metal salts of dithio carbamic acid or thioacetamide (U.S. Pat. Nos. 1,880,449 and 2,999,035), reduction of metallic salts such as silver to free metal as with indane 1,3 diones (U.S. Pat. No. 3,773,512) and amine-cyclic polyketone reaction systems sensitive to heat (such as described in U.S. Pat. Nos. 3,024,362, 3,293,061 and 3,736,166). Technology utilizing color reaction mechanisms has been developed for thermal recording systems through a number of approaches in efforts to provide for coating stability and other desirable paper properties. For example, thermally responsive color reaction systems may have reactive components which are dispersed in particle form in a suitable binder (e.g., U.S. Pat. Nos. 3,328,191, 3,736,166 and 3,843,384). The cyclic polyketone reaction systems such as the amine-cyclic polyketone reaction systems are generally well known and exemplified by the amine-ninhydrin color reaction. The ninhydrin reaction, which will produce a colored (e.g., blue-violet) reaction product upon reaction with amines, is well known, and may be illustrated by one suggested reaction sequence as follows:

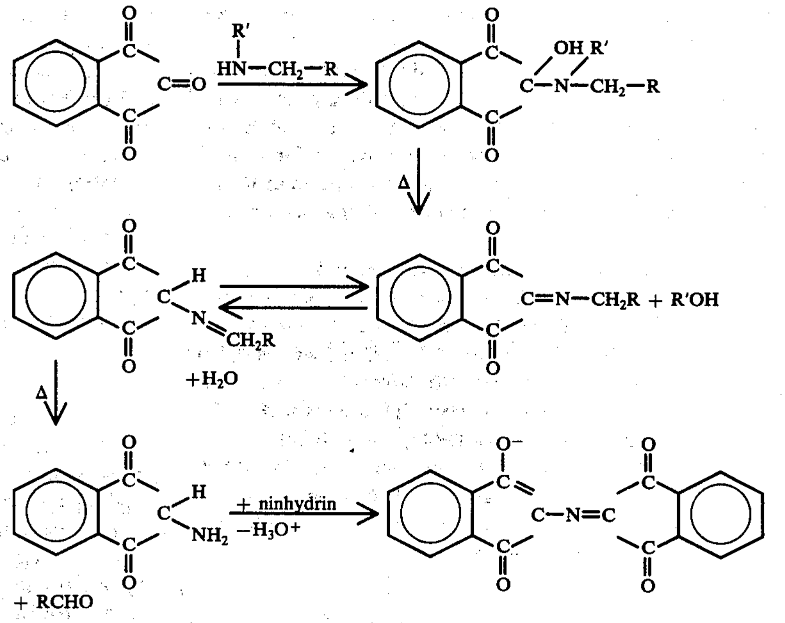

The reaction of ninhydrin with primary and secondary amines to yield a blue color is a general one and the color produced is, in general theory, independent of the source of the amine nitrogen because the original organic groups are stripped from the nitrogen during color formation. In practice, major color variations may result from the combined effects of competing color-forming reactions and postreactions together with the effects of the relatively great resistance to strip-off of various substituents such as certain aromatics. However, there is a tendency of such color reaction systems to form a distinct color rather than a black mark, and this tendency is a disadvantage for certain applications such as those involving some chart recording papers. A color reaction system which would reliably provide a dense black response to thermal activation would be very desirable.

Accordingly, it is an object of the present invention to provide an improved thermal recording sheet, including an improved chart recording paper. It is a further object to provide a thermal color reaction recording paper which has excellent stability and which does not foul a heated stylus recording tip or other heat source with which it comes in contact. Another object is the provision of an improved color reaction system which may be applied to a paper or other substrate from an aqueous dispersion and which does not unduly color the substrate before marking. It is also an object of the invention to provide a thermally responsive reproduction system which produces a dense black mark, or, optionally, colors.

In accordance with the present invention, a thermally responsive recording sheet is provided which comprises a substrate and a thermally responsive coating on the substrate comprising hydrindantin and an N,N' polythiodiamine. The present invention is also directed to an improvement in methods for recording on a thermally responsive sheet employing selective thermal activation of an amine polyketo color compound system, the improvement comprising conducting, upon said thermal activation, a color-forming reaction between a cyclic polyketo compound is reversibly reduced form and an N,N' polythiodiamine.

The present invention is particularly adapted for use in connection with thermal chart recording papers, and will be particularly described with respect to such papers. However, the invention in its broader forms has application to other systems, which are intended to be included within the spirit and scope of the present invention.

As indicated, the present invention employs a cyclic polyketo compound, color reactive with amines, in reversibly reduced form. The class of cyclic polyketo amine color reaction compounds is well known, as indicated, in example by U.S. Pat. No. 3,293,061, which has been previously referred to. Hydrindantin is a reversibly reduced dimeric form of the cyclic polyketo compound ninhydrin, which is conventionally produced by reduction of ninhydrin in caustic cyanide solution. The reduction is reversible and ninhydrin may be produced by oxidation of hydrindantin:

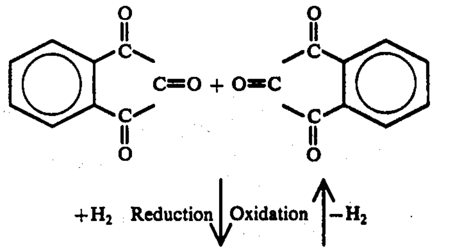

-continued

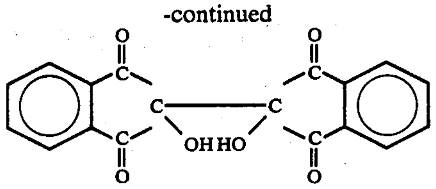

Hydrindantin, like ninhydrin, when anhydrous, is quite red in color. The colorless crystalline hydrated form, and particularly the dihydrate, is therefore preferred.

The second principal component of the color reaction system of the present invention is an N,N' polythiodiamine (including N,N' dithiodiamines) which has the capability to facilely cleave reductively, with oxidation of the reversibly reduced polyketo compound, to yield amine compounds which react with the polyketo compound formed thereby. Specifically contemplated are N,N'-substituted, N,N' polysulfide compounds having the chemical structure:

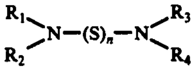

where N represents an amine nitrogen atom, and where $R_1$, $R_2$, $R_3$ and $R_4$ are hydrocarbon radicals, each preferably being an alkyl group or alkaryl group having from 1 to 10 carbon atoms. $(S)_n$, where $n$ is an integer from 2 to 6, represents a linkage of from 2 to 6 sulfur atoms, $R_2$ and $R_4$ may, alternatively, be hydrogen atoms. $R_1$ and $R_2$, and $R_3$ and $R_4$ may be joined covalently, for example, through methylene ($-CH_2-$), oxygen ($-O-$) or sulfide ($-S-$) linkages. In particularly preferred embodiments which may provide enhanced production of a black mark, the color system will include an N,N' polythiodiamine compound in which $n$ is greater than 2, and preferably from 4 to 6. It is known that such polysulfide linkages are readily cleaved under reductive conditions, and it is believed that the mild reducing potential of reversibly reduced polyketo compounds such as ninhydrin (e.g., hydrindantin) when the two are heated together, results in the reductive cleavage of the polysulfide linkage, and the concomitant oxidation of the reversibly reduced polyketo compound. It is further believed that the amine derivatives thereby produced,

either react directly with the co-generated polyketo compound such as ninhydrin to form a color compound such as ninhydrin-blue, or are reduced first to the free amine form prior to such reaction.

In this manner, an oxidative-reductive prerequisite to color formation is established which may be employed in the provision of stabilized thermal recording systems. A similar in-situ generation of amine from thiuram compounds and cyclic polyketo compounds from reversibly reduced polyketo compounds has been described in detail in copending application of Kenneth J. Quast entitled "Thermal Recording System" filed concurrently herewith and hereby incorporated herein by reference.

The N-substituted, N-polysulfide compounds may be produced, for example, by reaction of an amine with a sulfur chloride such as sulfur monochloride ($S_2Cl_2$) as described in Chemical Abstracts 53, No. 17, 16574h (1959) and the reference there abstracted.

As previously mentioned, it is desirable to provide reaction systems which produce a dense black mark, and N-polysulfide linkages having a sulfur chain greater than two sulfur atoms in length are capable of providing enhanced mark blackness.

In this connection, as disclosed in contemporaneously filed application Ser. No. 676,425 referred to hereinabove, when thiuram polysulfides linked by more than two sulfur atoms decompose to yield amine, they are also believed to liberate reactive sulfur which is apparently capable of reacting with the initially blue ninhydrin dye to convert it to a black form. The chemistry is not fully understood, but perhaps is similar to the reactions involved in the commercial manufacture of sulfur dyes which include compounds having colors ranging from dark brown to various shades of black. Reference may be made to Venkataraman, K., The Chemistry of Synthetic Dyes, Academic Press, N.Y., Vol. II. Ch. XXXV and XXXVI, pp. 1059–1117 (1952).

Having described the principal components of the color reaction system, it will now be appreciated that although dependent on a color forming reaction between an amine and a cyclic polyketo compound, the principal coreactants provided on the substrate in accordance with the present invention are so chosen as to be not directly reactive to form a colored reaction product. Hydrindantin is a reversibly reduced dimer of the cyclic polyketo compound ninhydrin which has been stabilized in the dimer form by chemical reduction. Similarly, the N,N' polythiodiamine component is made from a material which readily decomposes to yield an amine, and which may be regarded as being in an oxidized state with respect to the amine by virtue of the polysulfide chain. A prerequisite to facile color formation is that the N,N' polythiodiamine component be reduced and that the prereduced hydrindantin be oxidized. These components are capable of participating in a redox reaction with each other to accomplish this respective reduction and oxidation when thermally activated, but only after intimate admixture.

In the manufacture of thermally responsive chart recording papers, the reduced polyketo component and the N,N' polythiodiamine component, in a suitable binder solution, may be coated on the desired substrate, usually paper. A variety of different binder materials may be used, and the particular binder may be selected based upon the end use of the coated product.

The reduced polyketo component and the N,N' polythiodiamine component are generally insoluble in water. These components are soluble in various organic solvents and may be coated on the substrate from organic solvent solution or emulsion, either separately or from the same solution, and preferably with a suitable binder material. However, for thermal chart paper application, the coating system is advantageously an aqueous system in which the binder is water-soluble or dispersable, and in which the reduced polyketo component and the N,N' polythiodiamine component are present in finely divided particulate form. Suitable binders include polyvinyl acetate which has been 65 to 100% prehydrolized to polyvinyl alcohol, and preferably also premodified by reaction with ethylene oxide to add pendant ether-linked hydroxyethyl groups for internal plasticization, methyl cellulose, and methyl celluloses modified to also contain other ether-linked lower alkyl groups. Other suitable water-based binders include modified starches and latices containing styrene-butadiene polymers, acrylic polymers, and/or vinyl acetate polymers. Water-soluble polymers of vinyl methyl ether may be too tacky for use alone, but, as a binder component, such polymers may tend to soften other water-soluble binder materials and may be beneficially used for this purpose. Even suitably prepared gelatin solutions (for example, containing about 5 parts by weight morpholine per 100 parts gelatin to moderate a tendency of this material to set to a gel) might be used in a binder system.

The principal co-reactants must be intimately mixed to provide color compound formation upon thermal activation, and in this regard, the binder material chosen for thermal chart recording papers for use with heated stylus recording instruments in which the stylus contacts the paper, will generally be selected so as to soften and not inhibit the development of colored compound formation at locations contacted by the stylus. The binder material should also best be selected to substantially prevent flooding of the thermally induced mark in those adjacent mechanically undisturbed areas which are radiantly or conductively heated by an overly hot stylus.

The weight of the binder to be used will usually fall within the range of 10 to 100 parts by weight per 100 parts of other ingredients of the coating, on a dry basis. For paper coating application, generally from about 0.3 to about 2.0 pounds, and preferably from about 0.5 to about 1.0 pounds of reversibly reduced cyclic polyketo compound will be used per ream (one side, 3000 sq. ft.) of substrate, and generally from about 0.3 to about 3.0, and preferably from about 0.5 to about 2.0, moles of the N-polysulfide component per mole of the cyclic polyketo component will also be used.

Various other materials may be included in the color system formulation for various purposes if desired. For example, fluxing aids to facilitate the intimate admixture of the principal coreactants upon thermal activation, such as diphenyl guanidine and dihydroxydiphenyl sulfone may be incorporated in the coating composition. Inorganic materials such as titanium dioxide and calcium carbonate may be used to enhance paper whiteness, although it will be recognized that such inorganic materials are generally undesirable for applications such as heated stylus chart recording paper. Other materials, such as organic whiteners and brighteners may be similarly employed to achieve a particular purpose, provided they do not have an excessively injurious effect on system stability or performance.

In the manufacture of the coated substrate, the principal reactants of the color reaction system, the binder, and any optional ingredients, are coated on a suitable substrate. For thermal chart recording papers, coating the materials from an aqueous dispersion is particularly desirable. In such aqueous systems, the reversibly reduced cyclic polyketo component and the N,N' polythiodiamine component are provided in the dispersion in finely divided form so that the principal thermally coreactive ingredients, which are generally insoluble in water, will be present in the dried, active coating as dispersed, finely divided solid particles. Preferably the particle size of each of these components should be less than 2 microns and should best be below 0.5 microns. Such dispersions in the aqueous binder may be provided in an appropriate manner such as by grinding the materials in an aqueous solution of the binder material. For example, the components may be ground in a ball mill until a desired level of particle size is achieved. Other methods may be used where appropriate, such as processing by means of a three roll mill or an Attritor.

The following examples illustrate various aspects of the present invention. In these examples, amounts are indicated in parts by weight. For aqueous systems, the binders used are made into stock solutions containing 5 parts by weight binder and 95 parts by weight water. The remaining ingredients are individually dispersed by ball milling fifteen parts by weight of the water insoluble ingredient in 60 parts by weight of the stock binder solution until suitably fine, and coating formulations are made by blending these ball milled grinds. The formulations are coated on a 30 lb/3000 sq. ft. ream base paper using a wire-wound metering rod. After warm air drying, coating weights are approximately 2.0 lbs/3000 sq. ft. ream. Two and one half inch wide strips of the dried, coated paper are then tested on a Sanborn 500 Viso-Cardiette electrocardiograph (Sanborn Division, Hewlett-Packard Co., Inc.) using a simulated heart signal, with the manufacturer's recommended stylus, stylus pressure, heat and speed settings being used in the testing.

EXAMPLES 1 and 2

Two coating formulations prepared in the above manner having the following compositions, which compare a formulation (Example 1) in accordance with the previously mentioned contemporaneously filed application Ser. No. 676,425 with a formulation (Example 2) in accordance with the present invention

| Example No. | 1 | 2 |
|---|---|---|
| Hydrindantin dihydrate | 10 | 10 |
| Bis(diethylene oxide) thiuram disulfide | 5 | 0 |
| 4,4'Dithiodimorpholine | 0 | 5 |
| Aqueous binder solution composed of: | | |
| Poly (vinyl alcohol) | 3 | 3 |
| Water | 57 | 57 |

Example 1 employs the thiuram disulfide derivative of morpholine:

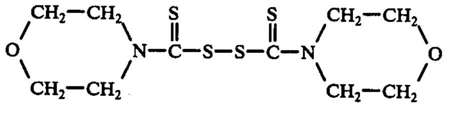

and Example 2 employs the N-disulfide bis derivative of morpholine:

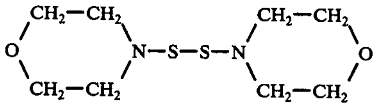

When tested, the recording paper of Example 1 provides a dense blue-violet mark graphically reproducing the simulated heart signal. The recording paper of Example 2 provides test results which are generally comparable to those of Example 1.

EXAMPLES 3 and 4

The thermal response of a coating employing the thiuram disulfide derivative of piperidine, illustrated in Example 3, was compared to one employing the N,N' dithio derivative of piperidine, illustrated in Example 4.

| Example No. | 3 | 4 |
|---|---|---|
| Hydrindantin, dihydrate | 10 | 10 |
| Bis(penta methylene)thiuram disulfide | 10 | 0 |
| N,N'dithiodipiperidine | 0 | 10 |
| Aqueous binder solution composed of: | | |
| Hydroxypropyl Cellulose | 4 | 4 |
| Water | 76 | 76 |

When tested, the recording papers of Examples 3 and 4 provided generally comparable dense blue marks.

EXAMPLES 5-7

N,N'-dithiodipiperidine readily combines with elemental sulfur to form polysulfide oils having an n value of 4 to 6. Similar oils were obtained when the sulfur was first reacted with the sulfur monochloride called for in the aforementioned method for synthesizing N,N'-dithiodiamines. A coating prepared using this oil, illustrated in Example 5, gave the expected black mark typical of thiuram polysulfide derivatives for which $n > 2$, which is shown by Example 6.

Example 7 is a 1 to 4 blend of Example 4 and Example 6 mixes. Thermal recording sheets made using the Example 7 composition yielded dense black markings generally comparable to those obtained from Example 6, even when considerably less stylus heat was used.

| Example No. | 5 | 6 | 7 |
|---|---|---|---|
| Hydrindantin, dihydrate | 10 | 10 | 10 |
| N,N'polythiodipiperidine (n = about 5) | 10 | 0 | 0 |
| Di(pentamethylene) thiuram hexasulfide | 0 | 10 | 8 |
| N,N'dithiodipiperidine | 0 | 0 | 2 |
| Aqueous binder solution composed of: | | | |
| Hydroxypropyl cellulose | 4 | 4 | 4 |
| Water | 76 | 76 | 76 |

While the present invention has been described with particularity for an aqueous dispersion coated chart recording paper for use with a heated stylus recording instrument, it will be apparent that various modification and adaptations may be made which are within the spirit and scope of the invention. For example, while an unsubstituted cyclic polyketo component has been specifically described, substituted cyclic polyketo compounds and mixtures of such compounds with each other and/or an unsubstituted polyketo compound, to the extent such substitution does not have a deleterious effect on the system, are contemplated and may provide for color variation or a more chemically efficient attainment of a dense black mark or desired color mark, particularly where a higher N,N' polythiodiamine is not used. Moreover, while the invention has been described particularly with respect to N,N' dithiodiamine compounds, compounds having oligomeric or polymeric N-substituted, N-polysulfide functionality $[>N \text{-}(S)_n\text{-}]$ might be employed. Substrates other than paper (such as organopolymeric sheets) may also be used, and other applications for paper-substrate systems, such as for thermal computer printout purposes, are also contemplated.

Other modifications and adaptations within the spirit and scope of the present invention will be apparent from the present disclosure.

Various of the features of the invention are set forth in the following claims.

What is claimed is:

1. A thermally responsive recording sheet comprising a substrate and a thermally responsive coating on the substrate comprising, in a reversibly reduced form, a cyclic polyketo compound, color reactive with amines, and an N,N' polythiodiamine.

2. A recording sheet in accordance with claim 1 wherein said reversibly reduced cyclic polyketo compound is hydrindantin.

3. A recording sheet in accordance with claim 2 wherein said substrate is paper, wherein said coating includes an organopolymeric binder and wherein said hydrindantin and said N,N' polythiodiamine are each present in finely divided form.

4. A recording sheet in accordance with claim 3 wherein said N,N' polythiodiamine comprises an N,N' polythiodiamine having a sulfur chain of more than two sulfur atoms.

5. A recording sheet in accordance with claim 4 wherein said hydrindantin is in hydrated form.

6. A recording sheet in accordance with claim 3 wherein said hydrindantin is in hydrated form.

7. A recording sheet in accordance with claim 3 wherein said organopolymeric binder is a water soluble polymer.

8. A recording sheet in accordance with claim 7 wherein said water soluble polymer is selected from the group consisting of polyvinyl alcohol, methyl cellulose, and hydroxypropyl cellulose.

9. In a method for recording on a thermally responsive sheet employing selective thermal activation of an amine-polyketo color compound system to produce a visible mark, the improvement comprising conducting, upon said thermal activation, a redox reaction between a cyclic polyketo compound in reversibly reduced form and an N,N' polythiodiamine to reductively decompose said N,N' polythiodiamine and to oxidize said reduced polyketo compound to provide, respectively, cyclic polyketo compound and reactive amine components of an amine-cyclic polyketo color compound system responsive to said thermal activation.

10. A method in accordance with claim 9 wherein said N,N' polythiodiamine comprises N,N' polythiodipiperidine having a sulfur chain length of from 4 to 6.

11. A method in accordance with claim 9 wherein said N,N' polythiodiamine comprises an N,N' polythiodiamine having a sulfur chain length of more than two sulfur atoms.

12. A method in accordance with claim 11 wherein said reversibly reduced polyketo compound comprises hydrated hydrindantin.

13. A method of manufacturing a thermally responsive recording paper, comprising, providing an aqueous coating dispersion of finely divided hydrindantin and finely divided N,N' polythiodiamine in an aqueous solution or dispersion of a suitable water soluble or dispersable binder material, coating a base paper substrate with said aqueous coating dispersion, and drying said coated paper.

* * * * *